United States Patent [19]

Dolev

[11] Patent Number: 5,224,814
[45] Date of Patent: Jul. 6, 1993

[54] CATAMARAN TRAILER

[76] Inventor: Moshe Dolev, 22 Yehiam St., Ramat Hasharon, Israel

[21] Appl. No.: 714,867

[22] Filed: Jun. 13, 1991

[51] Int. Cl.$^5$ ............................................. B60P 3/10
[52] U.S. Cl. .................................... 414/495; 414/476; 414/786; 280/414.1; 114/344
[58] Field of Search ............... 414/458, 459, 476, 495, 414/786; 280/47.32, 47.331, 414.1, 414.2; 410/2; 114/344

[56] References Cited

U.S. PATENT DOCUMENTS

| | | | |
|---|---|---|---|
| 2,822,944 | 2/1958 | Blomgren | 414/458 |
| 3,977,690 | 8/1976 | Carn | 280/47.331 |
| 4,232,879 | 11/1980 | Boxrud | 414/458 X |
| 4,233,239 | 11/1980 | Whitney | 280/47.331 |
| 4,235,450 | 11/1980 | Conover | 280/47.32 |
| 4,243,242 | 1/1981 | Waits | 280/414.1 |
| 4,286,800 | 9/1981 | Lomas | 414/495 X |
| 4,522,548 | 6/1985 | Oswald et al. | 414/458 |
| 4,589,814 | 5/1986 | Cates | 414/495 X |
| 4,754,998 | 7/1988 | LeJuerrne | 280/414.1 X |
| 4,801,153 | 1/1989 | Wilson | 280/414.1 |

FOREIGN PATENT DOCUMENTS

| | | | |
|---|---|---|---|
| 167832 | 1/1955 | Australia | 414/458 |
| 519148 | 3/1955 | Italy | 414/458 |
| 668600 | 10/1964 | Italy | 280/414.1 |

Primary Examiner—Michael S. Huppert
Assistant Examiner—James T. Eller, Jr.
Attorney, Agent, or Firm—Edward Langer

[57] ABSTRACT

A catamaran trailer on a wheeled chassis supporting a lifting mechanism comprising two pairs of pivotable lifting arms spaced apart from one another at front and rear portions of the chassis. Each of a pair of lifting arms is integrally formed in a U-shaped construction with one of forward and rear shafts, with the shafts being connected in the preferred embodiment, by an arrangement of sprocket wheels and a chain. An operating handle attached at one end to the forward shaft causes it to rotate when the handle is raised or lowered. The sprocket wheels and chain transfer the rotational motion to the rear shaft such that front and rear lifting arms are raised and lowered simultaneously, to lower or lift the catamaran. The design enables lowering of the lifting arms below the top of the frame, which may be slid under low-profile catamarans, while maintaining a constant lifting force during operation regardless of the lifting arm angle. The free end of each lifting arm is provided with a support lug shaped to engage an edge of the catamaran from the underside, making it slidable on the lifting arms and support lugs, so that after it is raised, it can be balanced on the trailer without interfering with its structure. The operating handle is provided with sufficient length to increase the mechanical advantage of the lifting mechanism and reduce the physical exertion required, so that a single user is capable of loading and unloading the catamaran easily and quickly. The operating handle is detachable to avoid interference with the cables supporting the catamaran mast, enabling sliding of the trailer in relation to the catamaran for unloading and loading without removing the mast.

18 Claims, 2 Drawing Sheets

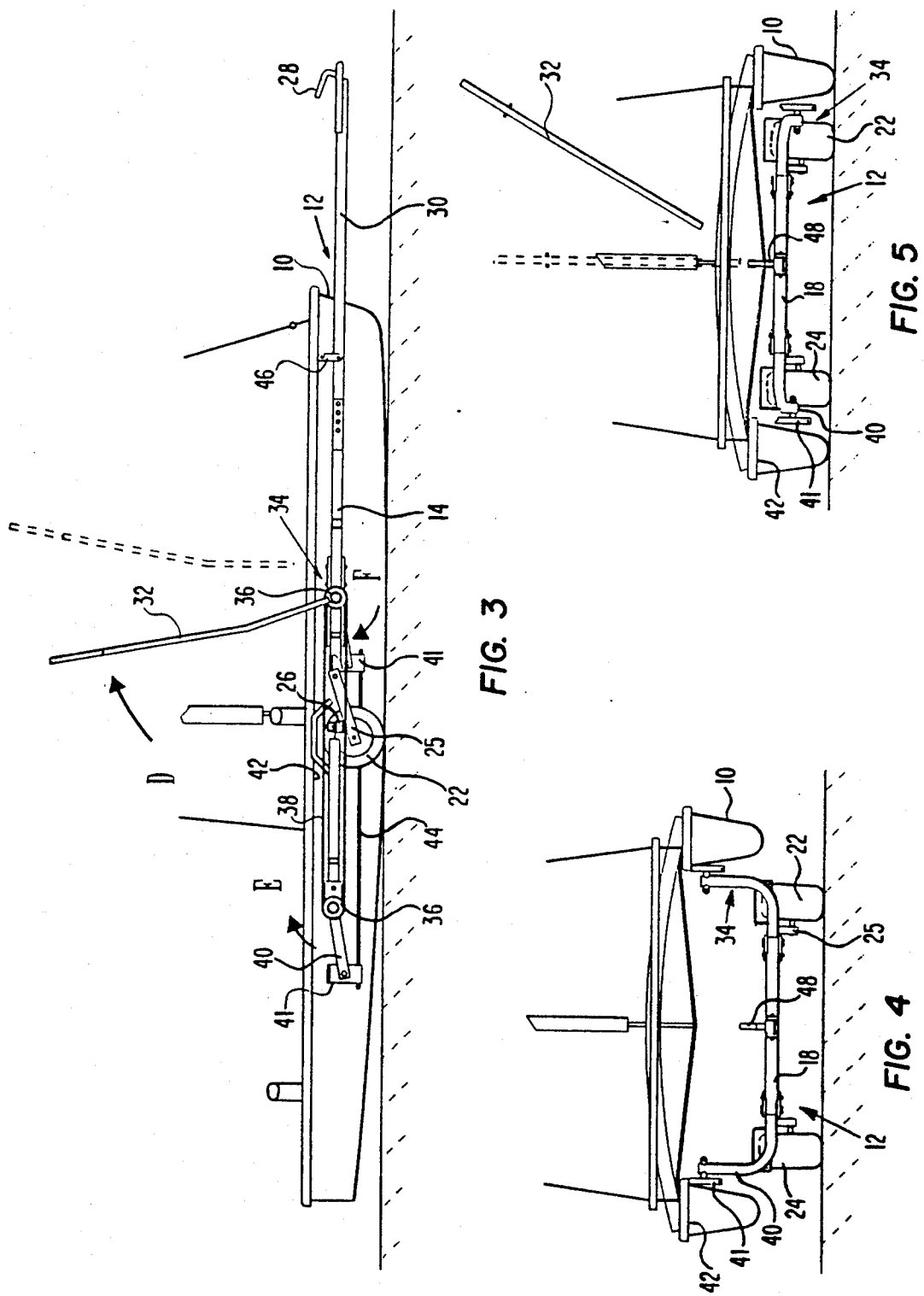

CATAMARAN TRAILER

FIELD OF THE INVENTION

The present invention relates to trailers for carrying boats, catamarans and the like, and more particularly, to a trailer featuring easy loading and unloading of a catamaran.

BACKGROUND OF THE INVENTION

The prior art of boat trailers includes a number of simple designs which provide for mobility but do not provide a mechanism for loading and unloading boats or catamarans. Examples of this design include a simple catamaran dolly as disclosed in U.S. Pat. No. 4,243,239 to Whitney. U.S. Pat. No. 4,235,450 to Conover discloses a catamaran dolly having a cradle shaped to engage the hull. A boat trailer having load-bearing arms on a wheeled axle is disclosed in U.S. Pat. No. 3,977,690 to Carn. A simple boat dolly with means for receiving the boat hulls is disclosed in Australian Patent Au-A-14990/83 to Coombe. French Patent No 2,639,893 to Lopez discloses a simple wheeled boat trailer frame. German Patent DE 3147464 A1 to Glodowski discloses a boat trailer with cradles for supporting the hull.

A catamaran-camper trailer having the catamaran straddling the camper vehicle is disclosed in U.S. Pat. No. 4,754,998 to LeJuerrne. An expansible boat trailer is disclosed in U.S. Pat. No. 4,243,242 to Waits, in which a collapsible boat construction is supported by an expanding cradle structure which moves with the hulls to allow boat assembly after transport.

The prior art also includes boat trailers which feature loading and unloading mechanisms, such as in U.S. Pat. No. 4,286,800 to Lomas, which discloses a boat trailer having a load support frame which can be raised and lowered between traveling and unloading positions. The movable load support frame rests on another frame which is supported by wheels upon an axle. Thus, the lowest position of the load support frame is still above the wheeled frame, and this position does not allow unloading of those modern catamaran designs having an especially low profile.

In addition, the Lomas patent describes the raising and lowering mechanism of the load support frame, in which the frame itself is used to transfer the lifting force. When in the lowered position, the load support frame is directly over the wheeled frame and does not act as a lever for lifting, so that set of springs is provided under the load support frame to assist in developing the lifting force. This makes the design complicated, heavy and more costly.

Another difficulty with the use of the trailer disclosed in the Lomas patent is that the construction of the load support frame interferes with the cross-beam between the hulls of modern catamaran designs. This prevents forward or backward adjustment of the catamaran position to balance its weight on the trailer.

In PCT Patent WO 90/01432 to Benest, there is disclosed a trailer for catamarans which can also function as a launch trolley. The trailer comprises a frame having first and second lifting members to apply lifting thrust at spaced locations under the cross-beams of the catamaran. A lever mechanism provides the lifting thrust. In order to unload the catamaran, the trailer is detached from the towing vehicle and partially slid into the water, before operating the lever mechanism to release the lifting thrust. The design is complicated, heavy and expensive.

As with the Lomas patent, the cross-beams between the hulls of the catamaran interfere with the trailer frame to prevent forward or backward adjustment of the catamaran to balance its weight on the trailer. Also, neither the Lomas nor Benest designs allow for loading or unloading of the catamaran assembled with the mast, because the cables supporting the mast interfere with the lifting mechanism, and this interference is also a problem with catamarans having a third crossbeam in front.

With the increase in popularity of modern catamaran designs, the need for an easy-to-use boat trailer has increased. It would therefore be desirable to provide the boating enthusiast with a catamaran trailer which enables him to self-load and unload the catamaran quickly and with minimum inconvenience.

SUMMARY OF THE INVENTION

Accordingly, it is a principal object of the present invention to overcome the disadvantages of prior art designs and provide a boat trailer for use with catamarans designed for quick and simple operation by a single user.

In accordance with a preferred embodiment of the invention, there is provided a catamaran trailer comprising:

a frame supported by a wheeled axle;

a lifting mechanism mounted on said frame comprising at least a pair of lifting arms spaced apart longitudinally and being pivotable on said frame for simultaneously lifting a catamaran by its edges, each of said lifting arms being shaped to engage said edges of the catamaran from the underside thereof between its hulls and lift it when said lifting arms pivot between substantially horizontal and vertical positions; and drive means causing said lifting mechanism to raise and lower the catamaran by pivoting said lifting arms alternately between said substantially horizontal and vertical positions.

In the preferred embodiment, the catamaran trailer is a wheeled chassis having mounted thereon a lifting mechanism which comprises two pairs of pivotable lifting arms spaced apart from one another at front and rear portions of the chassis. Each of pair of lifting arms is integrally formed in a U-shaped construction with one of forward and rear shafts, with the shafts being connected by an arrangement of sprocket wheels and a chain. An operating handle shaped as a lever attached at one end to the forward shaft causes it to rotate when the handle is raised or lowered. The sprocket wheels and chain transfer the rotational motion to the rear shaft, and thus, the front and rear lifting arms are raised and lowered simultaneously, to lower or lift a catamaran placed on them.

The use of a chain and sprocket wheels enables lowering of the lifting arms below the top of the frame, which may be slid under low-profile catamarans, while maintaining constant lifting force during operation regardless of the lifting arm angle.

The free end of each of the lifting arms is provided with a support lug shaped to engage an edge of the catamaran from the underside. The support lugs engage an upper, inwardly facing edge near the top of the hull, such that the trailer can be slid underneath the catamaran to lift it quickly and easily.

An advantage of the inventive design is that the catamaran is lifted by its edges, making it slidable on the lifting arms and support lugs, so that after it is raised, it can be balanced on the trailer without interfering with its structure.

By virtue of its novel construction, the inventive design requires less physical exertion by the user to lift the catamaran. This is because the operating handle is connected directly to the front axle, so that the use of a long operating handle in relation to the length of the lifting arms increases the mechanical advantage of the lifting mechanism.

Based on its inventive design, a single user is capable of loading and unloading the catamaran easily and quickly. The design simplicity also reduces production costs.

Other features and advantages of the invention will become apparent from the following drawings and description.

BRIEF DESCRIPTION OF THE DRAWINGS

For a better understanding of the preferred embodiment, reference is made to the accompanying drawings, in which like numerals designate corresponding elements or sections throughout, and in which:

FIG. 3 shows the catamaran trailer as viewed in FIG. 2, with the lifting mechanism shown in the lowered position; and FIGS. 4-5 are front views of the trailer with the lifting mechanism, respectively, in raised and lowered positions.

DETAILED DESCRIPTION OF A PREFERRED EMBODIMENT

Figure 1:
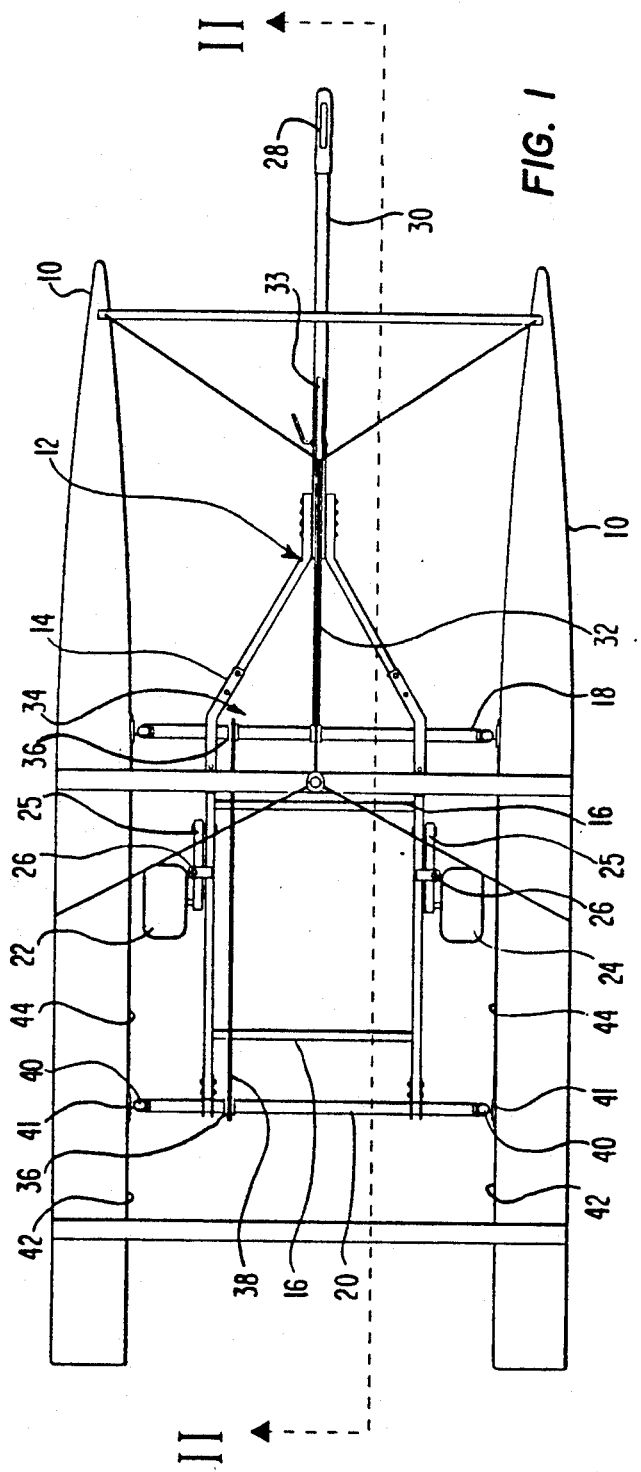
FIG. 1 is a top view of a preferred embodiment of a catamaran trailer constructed and operated in accordance with the principles of the present invention, showing a catamaran thereon.

Referring now to FIG. 1, there is shown a top view of a catamaran 10 loaded on a preferred embodiment of a catamaran trailer 12 constructed and operated in accordance with the principles of the present invention. The trailer 12 comprises a substantially planar frame 14 having crossbars 16 disposed between front and rear shafts 18 and 20, which are rotatably mounted in frame 14. Frame 14 is supported on the ground by wheels 22 and 24, each of which is mounted at the end of a strut 25 provided with a shock absorber 26. A trailer hitch 28 is mounted to the end of a towing bar 30 extending from frame 14 for connection to a towing vehicle.

Attached to front shaft 18 is an operating handle 32 provided as a lever, the free end 33 of which extends in the direction of towing bar 30. Handle 32 is used to operate a lifting mechanism 34, comprising an arrangement of sprocket wheels 36 and a chain 38, connecting front and rear shafts 18 and 20. Lifting mechanism 34 also comprises lifting arms 40 each of which is integrally formed with the end of shafts 18 and 20, in a U-shaped construction (FIG. 4). Lifting arms 40 pivot with shaft rotation in frame 14. Pivotably mounted at the end of each lifting arm is a support lug 41.

Each of lifting arms 40 is designed with sufficient strength to support a catamaran load and each support lug 41 is shaped with a ridge to engage an upper, inwardly facing edge 42 near the top of the hull of catamaran 10. As described further herein, support lugs 41, when raised, extend above frame 14 and on both sides thereof, and are the only parts of trailer 12 to come into contact with catamaran 10. Thus, support lugs 41 are padded so as not to damage the catamaran 10 hulls.

Figure 2:
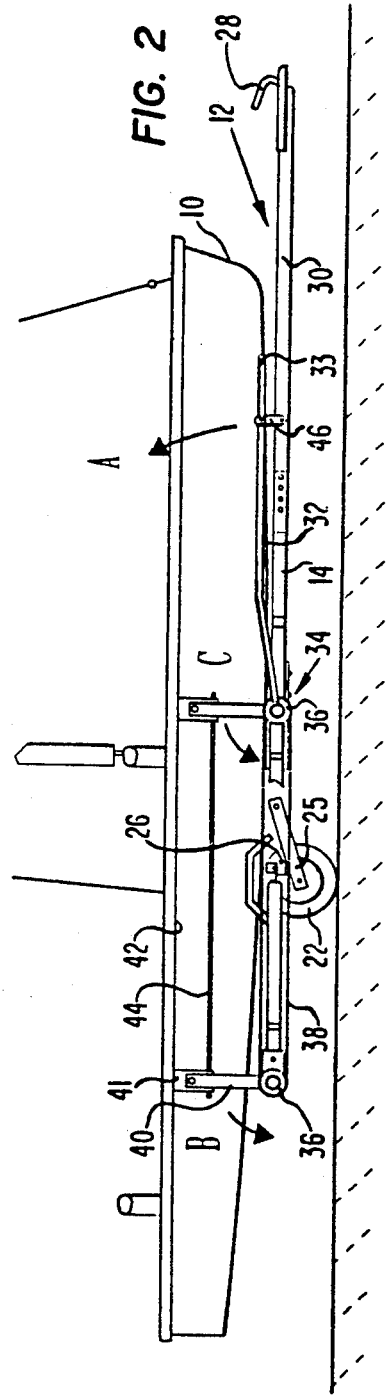
FIG. 2 is a cross-sectional view of the trailer taken along section lines II—II of FIG. 1, showing a catamaran raised on a lifting mechanism supported by the trailer of FIG. 1.

In use, free end 33 of operating handle 32 may be raised or lowered so as to operate lifting mechanism 34, such that when handle 32 is raised, catamaran 10 is unloaded from trailer 12. FIG. 2 shows a cross-sectional view of catamaran trailer 12 taken along section lines II—II of FIG. 1, showing operating handle 32 lowered to rest on towing bar 30. In this position, lifting arms 40 are oriented substantially vertically such that support lugs 41 extend above the top of frame 14 and engage edge 42 of catamaran 10, shown raised.

A stabilizer bar 44 maintains the vertical orientation of support lugs 41, shown with rectangular shape, insuring that they move together in coordinated fashion while raising or lowering catamaran 10. Stabilizer bar 44 is not needed if support lugs 41 are round-shaped, since any orientation is then suitable.

When operating handle 32 is raised in the direction indicated by arrow A, lifting mechanism 34 operates by driving the rotation of front shaft 18. Simultaneously, sprocket wheels and chain arrangement 36-38 transfers the rotational motion of front shaft 18 and drives the rotation of rear shaft 20. This causes lifting arms 40 to be lowered as indicated by arrows B-C, thereby lowering catamaran 10 to the ground as shown in FIG. 3.

Once they are lowered, lifting arms 40 and support lugs 41 do not interfere with the underside of catamaran 10, since they are below the level of frame 14, such that trailer 12 may be wheeled out from under catamaran 10 even on uneven sand, or wheeled under it when positioned for loading (FIGS. 3 and 5).

It will be appreciated by those skilled in the mechanical arts that sprocket wheels and chain arrangement 36-38 in the preferred embodiment may be replaced by suitable alternative mechanical means for transferring the rotational motion from front shaft 18 to rear shaft 20. For example, a set of transmission gears could be provided for this purpose.

It will also be appreciated that operating handle 32 can be replaced by other means for operating lifting mechanism 34, such as a worm gear.

Also illustrated in FIG. 3 is a simple procedure for loading catamaran 10, by sliding trailer 12 under it so that lifting arms 40 and support lugs 41 are aligned with edge 42. When operating handle 32 is lowered as indicated by arrow D, lifting mechanism 34 operates as indicated by arrows E and F to raise lifting arms 40, such that support lugs 41 engage edge 42. Operating handle 32 is then lowered over towing bar 30 as shown in FIG. 2, and it may be locked in position using locking means 46 attached to bar 30. Use of a sufficiently long handle 32 as a lever in relation to lifting arms 40 provides the mechanical advantage to minimize the user effort needed to lift catamaran 10.

Once loaded on the trailer 12, it may be necessary to adjust the position of catamaran 10 to achieve proper balance. This is easily accomplished in the inventive design since catamaran 10 is slidable on support lugs 41 along edges 42, and since lifting arms 40 do not interfere with the structure underneath the catamaran 10. Once adjusted for balance, catamaran 10 may then be secured to trailer 12 as necessary.

In FIGS. 4-5, there are shown front views of catamaran trailer 12 showing lifting mechanism 34, respectively, in raised and lowered positions. As indicated by the dotted lines in FIG. 5, operating handle 32 may be constructed so as to be slidably detachable from a shorter portion provided as a mounting bracket 48 which is fixedly attached to front shaft 18.

The detachable operating handle 32 provides an important advantage in use of trailer 12, since by detaching handle 32, it is possible to slide trailer 12 under catamaran 10 without interfering with the cables supporting the mast or with a third crossbeam, if provided. During the loading or unloading procedure, if the cables or the crossbeam interfere with operating handle 32, catamaran 10 may be adjusted by sliding backward or forward on lifting arms 40 to clear the interference.

In summary, the inventive catamaran trailer design offers simplicity of construction and enables a single user to achieve loading and unloading of the catamaran by use of an easily operated lifting mechanism. The trailer construction does not interfere with balance adjustment of the catamaran once loaded, and its simple construction reduces production cost. Also, trailer 12 unloading is possible with the towing vehicle attached.

Having described the invention with regard to certain specific embodiments thereof, it is to be understood that the description is not meant as a limitation since further modifications may now suggest themselves to those skilled in the art and it is intended to cover such modifications as fall within the scope of the appended claims.

I claim:

1. A catamaran trailer comprising:
   a frame;
   a wheeled axle supporting said frame:
   a lifting mechanism mounted on said frame comprising two pairs of lifting arms spaced apart longitudinally and being pivotable on said frame for simultaneously lifting a catamaran by edges thereof between its hulls, each of said lifting arms being shaped to engage said catamaran edges from the underside thereof and lift the catamaran when said lifting arms pivot between substantially horizontal and vertical positions; and
   drive means causing said lifting mechanism to raise and lower the catamaran by pivoting said lifting arms alternately between said substantially horizontal and vertical positions,
   wherein each lifting arm pair is integrally formed in a U-shaped construction with a respective front and rear shaft pivotable on said frame, said lifting mechanism further comprising mechanical means mounted on said front and rear shafts for directly transferring rotational motion from said front shaft to said rear shaft, such that when said front shaft is pivoted, said rear shaft pivots likewise to develop a constant lifting force during pivoting of said lifting arms.

2. The trailer of claim 1 wherein said drive means comprises a lever connected to said front shaft for rotating said front shaft.

3. The trailer of claim 2 wherein said lever is detachable from said front shaft to minimize interference with the underside of the catamaran while sliding the trailer in relation thereto.

4. The trailer of claim 2 wherein the catamaran is slidable forward and backward as necessary on said lifting arms while being lifted or lowered thereon, to allow clearance between said lever and a third crossbeam at the front of the catamaran.

5. The trailer of claim 2 wherein the catamaran has an assembled mast supported by cables and wherein said lifting mechanism is operable without removing said mast, by manipulating the catamaran backward and forward as necessary on said lifting arms while being lifted or lowered thereon, to provide clearance between said mast cables and said lever.

6. The trailer of claim 1 wherein when said lifting arms are pivoted into said substantially horizontal position, free ends of said lifting arms are below the top of said frame on either side thereof so that said trailer is easily movable toward and away from the catamaran between the hulls thereof without interfering with the catamaran underside.

7. The trailer of claim 1 wherein each of said lifting arms has mounted thereon a support lug at the end thereof, each of said support lugs having padding to prevent damage when contact is established between said support lugs and the catamaran.

8. The trailer of claim 7 wherein said padded support lugs extend above said frame on both sides thereof when lifting the catamaran and are the only parts of the trailer to contact the catamaran.

9. The trailer of claim 1 wherein the catamaran is slidable forward and backward on said lifting arms after having been lifted thereon, to allow load balancing on the trailer.

10. The trailer of claim 1 wherein said drive means comprises a lever constructed as a telescopic arrangement of collapsible tubes, said lever being connected to rotate said front shaft.

11. The trailer of claim 1 wherein said mechanical means comprises a sprocket wheel mounted on each of said front and rear shafts, and a chain looped between said sprocket wheels, such that when said front shaft is pivoted, said rear shaft pivots likewise as said chain moves about said sprocket wheels.

12. A method of loading and unloading a catamaran on a trailer comprising the steps of:
   providing a frame;
   providing a wheeled axle supporting said frame;
   providing a lifting mechanism mounted on said frame comprising two pairs of lifting arms spaced apart longitudinally and being pivotable on said frame for simultaneously lifting the catamaran by edges thereof between its hulls, each of said lifting arms being shaped to engage said catamaran edges from the underside thereof and lift the catamaran when said lifting arms pivot between substantially horizontal and vertical positions; and
   operating said lifting mechanism to raise and lower the catamaran by pivoting said lifting arms alternately between said substantially horizontal and vertical positions,
   wherein each lifting arm pair is integrally formed in a U-shaped construction with a respective front and rear shaft pivotable on said frame, said lifting mechanism further comprising mechanical means mounted on said front and rear shafts for transferring rotational motion from said front shafts to said rear shaft, such that when said front shaft is pivoted, said rear shaft pivots likewise to develop a constant lifting force during pivoting of said lifting arms.

13. The method of claim 12 wherein said operating step further comprises lifting a lever connected to rotate said front shaft.

14. The method of claim 12 wherein when said lifting arms are pivoted into said substantially horizontal position during said operating step, the free ends thereof are below the top of said frame so that said trailer is easily movable toward and away from an underside of the catamaran without interfering with said underside.

15. The method claim 12 further comprising the step of sliding the catamaran forward and backward on said lifting arms after having been lifted thereon, to allow load balancing on said trailer.

16. The method of claim 12 wherein said operating step comprises providing a lever to operate said lifting mechanism, said lever being detachable from said lifting mechanism to minimize interference with the catamaran while positioning the trailer under the catamaran.

17. The method of claim 16 wherein during said operating step, said lifting mechanism is operable without removing a mast of the catamaran supported by cables, by sliding the catamaran backward and forward as necessary to provide clearance between said lever and said cables.

18. The method of claim 16 wherein during said operating step, the catamaran is slidable forward and backward as necessary on said lifting arms while being lifted or lowered thereon, to allow clearance between said lever and a third crossbeam at the front of the catamaran.

* * * * *